(12) United States Patent  
Ferguson

(10) Patent No.: US 11,356,450 B2  
(45) Date of Patent: Jun. 7, 2022

(54) MANAGING DATA ACCESS

(71) Applicant: Arm IP Limited, Cambridge (GB)

(72) Inventor: Peter James Samuel Ferguson, Cambridge (GB)

(73) Assignee: Arm IP Limited, Cambridge (GB)

( * ) Notice: Subject to any disclaimer, the term of this patent is extended or adjusted under 35 U.S.C. 154(b) by 419 days.

(21) Appl. No.: 16/361,670

(22) Filed: Mar. 22, 2019

(65) Prior Publication Data

US 2019/0327239 A1    Oct. 24, 2019

Related U.S. Application Data

(60) Provisional application No. 62/661,905, filed on Apr. 24, 2018.

(51) Int. Cl.
| | |
|---|---|
| *H04L 29/06* | (2006.01) |
| *H04L 9/40* | (2022.01) |
| *H04L 9/08* | (2006.01) |
| *H04L 9/06* | (2006.01) |
| *G06F 16/182* | (2019.01) |

(52) U.S. Cl.
CPC .......... *H04L 63/102* (2013.01); *G06F 16/182* (2019.01); *H04L 9/0637* (2013.01); *H04L 9/0643* (2013.01); *H04L 9/0819* (2013.01); *H04L 63/0876* (2013.01); *H04L 63/105* (2013.01); *H04L 2209/38* (2013.01)

(58) Field of Classification Search
CPC . H04L 63/102; H04L 9/0819; H04L 63/0876; H04L 9/0637; H04L 63/105; H04L 9/0643; H04L 2209/38; H04L 63/308; H04L 63/10; H04L 9/3239; G06F 16/182; G06F 16/122; G06F 21/6209; G06F 21/6245

See application file for complete search history.

(56) References Cited

U.S. PATENT DOCUMENTS

| | | | | |
|---|---|---|---|---|
| 7,788,700 | B1 * | 8/2010 | Feezel | G06F 21/31 |
| | | | | 726/2 |
| 9,973,481 | B1 * | 5/2018 | Sharifi Mehr | H04L 9/0825 |
| 10,104,077 | B1 * | 10/2018 | Irwan | H04L 63/0442 |
| 2007/0136603 | A1 * | 6/2007 | Kuecuekyan | H04L 63/0884 |
| | | | | 713/185 |
| 2007/0204329 | A1 * | 8/2007 | Peckover | H04L 63/08 |
| | | | | 726/3 |
| 2009/0327297 | A1 | 12/2009 | Deobhakta et al. | |
| 2012/0254320 | A1 | 10/2012 | Dove et al. | |

(Continued)

FOREIGN PATENT DOCUMENTS

KR    101708774 B1 *  3/2017

*Primary Examiner* — John B King
(74) *Attorney, Agent, or Firm* — Leveque Intellectual Property Law, PC

(57) ABSTRACT

The present techniques generally relate to a system comprising: a data resource comprising: a device data log to store a device data record for device data of a first device; a permissions log to store a permissions record for one or more permissions associated with the device data; a consent log to store a consent record comprising a consent status for the one or more permissions; wherein the consent record, permissions record and device data record provide a verifiable data audit to determine whether a party is authorized to access the device data.

18 Claims, 6 Drawing Sheets

(56) References Cited

U.S. PATENT DOCUMENTS

| | | | |
|---|---|---|---|
| 2014/0089008 A1 | 3/2014 | Carner et al. | |
| 2014/0165189 A1* | 6/2014 | Foley | H04L 63/14 |
| | | | 726/22 |
| 2015/0188715 A1* | 7/2015 | Castellucci | H04L 9/3297 |
| | | | 713/178 |
| 2015/0213195 A1 | 7/2015 | Blechman | |
| 2015/0350188 A1* | 12/2015 | Gilpin | H04L 63/083 |
| | | | 726/9 |
| 2016/0027229 A1* | 1/2016 | Spanos | G07C 13/00 |
| | | | 705/51 |
| 2016/0028552 A1* | 1/2016 | Spanos | H04L 9/3236 |
| | | | 713/178 |
| 2016/0070758 A1 | 3/2016 | Thomson et al. | |
| 2016/0366146 A1* | 12/2016 | Keeler | H04L 41/28 |
| 2017/0091397 A1* | 3/2017 | Shah | G06Q 50/01 |
| 2017/0140174 A1* | 5/2017 | Lacey | G06F 21/6245 |
| 2017/0177898 A1* | 6/2017 | Dillenberger | H04L 9/3236 |
| 2018/0117446 A1* | 5/2018 | Tran | A42B 3/0433 |
| 2018/0150647 A1* | 5/2018 | Naqvi | H04L 9/3218 |
| 2019/0025818 A1* | 1/2019 | Mattingly | G05D 1/0027 |
| 2019/0052994 A1* | 2/2019 | Dar | H04L 65/1016 |
| 2019/0073670 A1* | 3/2019 | Ganesan | G06F 21/64 |
| 2019/0074974 A1* | 3/2019 | Ganesan | H04L 9/3242 |
| 2019/0163928 A1* | 5/2019 | Hankeln | G06F 21/62 |
| 2019/0197622 A1* | 6/2019 | Molinari | G06Q 20/065 |
| 2019/0245852 A1* | 8/2019 | Irwan | H04L 67/10 |
| 2019/0319927 A1* | 10/2019 | Levine | H04L 43/026 |

* cited by examiner

MANAGING DATA ACCESS

CROSS-REFERENCE TO RELATED APPLICATIONS

This application claims the benefit of U.S. Provisional Patent Application No. 62/661,905 filed on Apr. 24, 2018, the entire content of which is hereby incorporated by reference.

BACKGROUND

The present disclosure relates generally to the field of computing devices, and particularly, but not exclusively, to managing and tracking access to data generated by computing devices.

Many modern computing devices are enabled with so-called "smart" technologies that enable such devices to transmit and/or exchange data with other devices via wired or wireless communication networks, or both. An increasing number of these modern devices are configured to connect to and take advantage of services provided by various interconnected computing devices (e.g., servers), often referred to as the "cloud."

For example, relatively small devices, such as temperature sensors, healthcare monitors, and electronic door locks can be connected to the cloud, e.g., as part of the "Internet of Things" (IoT). In this way, the connected devices can be accessed and controlled using remote devices, such as mobile phones, tablet computers, laptop computers, desktop computers, or other such devices. For instance, a door lock may be remotely opened from a remote device (e.g., a smartphone). Furthermore, data generated by such connected devices can be accessed by different entities. For instance, data from a temperature sensor or healthcare device may be aggregated at a remote location (e.g., a server device) and accessed from another device, such as a laptop computer. As such, there is an increasing amount of data being collected by third parties.

At the same time, there is also an increasing concern among many users regarding the security of data collected by third parties. For instance, concerns that collected data, often viewed as secret in nature, can be accessed or even misused by third parties may discourage the use of connected (e.g., IoT) devices.

The present techniques seek to provide improvements over the prior art.

BRIEF DESCRIPTION OF THE DRAWINGS

The present techniques are diagrammatically illustrated, by way of example, in the accompanying drawings, in which.

DETAILED DESCRIPTION

Figure 1:
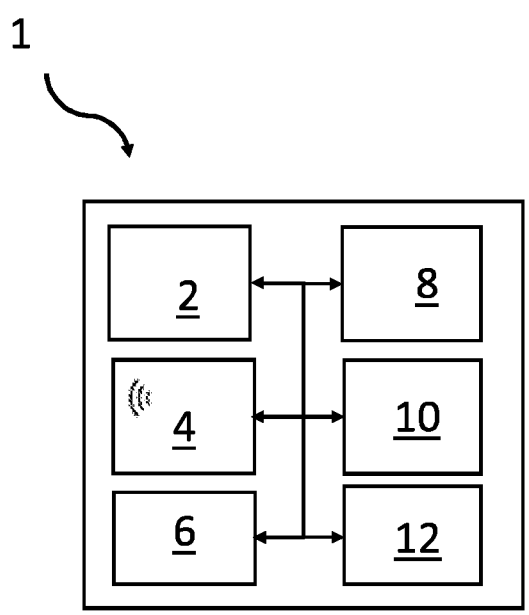
FIG. 1 is a block diagram illustrating an example computing device.

According to a first technique there is provided a system comprising: a data resource comprising: a device data log to store a device data record for device data of a first device; a permissions log to store a permissions record for one or more permissions associated with the device data; a consent log to store a consent record comprising a consent status for the one or more permissions; wherein the consent record, permissions record and device data record provide a verifiable data audit to determine whether a party is authorized to access the device data.

According to a further technique there is provided a method of determining whether a party is authorized to access device data of a first device, the method comprising: receiving, at a data resource, a device data record for the device data; receiving, at the data resource, a permissions record for one or more permissions associated with the device data; receiving, at the data resource, a consent record comprising a consent status for the one or more permissions; accessing, at the data resource, the device data record, the permissions record and the consent record; determining from one or more of the accessed consent and permissions records whether the party is authorized to access the device data corresponding to the accessed device data record.

According to a further technique there is provided a method of managing access to device data of a first device, the method comprising: receiving, at an application device, a first request for user approval of a first consent, the first consent related to first permissions for a first party to access first device data of the device data; obtaining, at the application device from the user, user approval for the first consent; transmitting, from the application device to a data resource, a consent record of the user approval for the first consent; receiving, at the application device, an identifier for the first party; transmitting, from the application device to the first device, the identifier for the first party to enable the first device generate the first device data.

According to a further technique there is provided a method of generating device data at a device, comprising: receiving at the device an identifier for a first party; receiving at the device a permissions manifest; generating, at the device, device data for the first party based on or in response to instructions in the permissions manifest; transmitting, from the device to the first party, the device data for the first party.

According to a further technique there is provided a device comprising circuitry to perform the method of any one of the method claims.

The present techniques provide systems, methods and devices for managing and tracking access to device data of computing devices and will be described more fully hereinafter with reference to the accompanying drawings. Like numbers refer to like elements throughout.

According to techniques of this disclosure, a computing device may be considered to be any device that generates or stores data which may be accessed by another party, such as a service provider.

Such computing devices may be mobile phones, laptops, computers and like and such computing devices may also be those commonly referred to at IoT (internet of things) devices, which are used to provide smart functionality for an associated object. As an illustrative example, such a device may be a medical device. For the purposes of this specification, computing devices will be hereafter be referred to as a "connected devices."

FIG. 1 is a block diagram illustrating an example connected device 1.

Connected device 1 comprises processing circuitry 2, such as a microprocessor, microcontroller, integrated circuit(s) for processing/generating data and for controlling various operations performed by the connected device 1.

The connected device 1 also comprises communication circuitry 4 for communicating with one or more resources remote therefrom such as a computer terminal or mobile device, service, gateway device etc.

The communication circuitry 4 may use wired communications such as a USB (universal serial bus) or lightening connector or the like. Additionally, or alternatively, the communications circuitry may use wireless communications, such as communications used in, for example, wireless local area networks (WLAN) and/or wireless sensor networks (WSN) such as Wi-Fi®, Thread®, ZigBee®, Bluetooth®, Bluetooth Low Energy® (BLE), LoRA®, NB-IoT, etc., using any suitable communications protocol such as lightweight machine-to-machine (LWM2M). The communication circuitry 4 may also comprise short range communication capabilities such as radio frequency identification (RFID) or near field communication (NFC).

The connected device 1 also comprises storage circuitry 6 (e.g. non-volatile/volatile storage), for storing data provisioned on, generated or generally made available by the connected device 1, hereafter "device data", as will be described in greater detail below.

The connected device 1 may also comprise input/output (I/O) circuitry 8, whereby the I/O circuitry 8 may be used to provide sensory outputs for an associated user (e.g. text on a display screen, light signals via more or more light emitting diodes, a sound via a speaker, a vibration via a pager motor etc.). The I/O circuitry 8 may also receive instructions from a user, e.g. via one or more buttons or via a display screen.

The connected device 1 may also comprise power circuitry 10 to power the various circuitry and components therein. In examples, the power circuitry comprises a battery. Additionally, or alternatively, the power circuitry comprises an energy harvester (e.g. Wi-Fi harvester), which may be used to power the various circuitry and components and/or to charge the battery. In other examples, the power circuitry may be connected to mains power supply.

The connected device may also comprise sensor circuitry 12 having sensors to detect user activity or interactions, whereby the device data will capture the user activity or interactions.

The sensor circuitry 12 may additionally, or alternatively, comprise sensors to detect changes in the environment local to the connected device such as a light, humidity and/or temperature sensors, and the sensor circuitry may also generate location data (e.g. using global positioning (GPS) sensors thereon) and time data for the device (e.g. using clock circuitry thereon).

As described above, the connected device may be provisioned with device data stored locally thereat, and the connected device may also generate device data.

Such device data may include application code, program code, an operating system, firmware, bootstrap data etc., which may be stored at the storage circuitry 6.

Such device data may also include connected device identification data comprising one or more device identifiers to identify the connected device 1, which may comprise one or more of: universally unique identifier(s) (UUID), globally unique identifier(s) (GUID) and IP address(es) (e.g. IPv4, IPv6 etc.), although any suitable device identifier(s) may be used.

The device data may also include authentication data for establishing trust/cryptographic communications between the connected device 1 and a remote resource. Such authentication data may include one or more trust identifiers such as cryptographic keys (e.g. public/private keys; symmetric key pairs), tokens, certificates (e.g. X.509 certificates) etc. The authentication data may be provisioned on the connected device 1 by any authorized party (e.g. by an owner, a manufacturer, or an installer) via the wired or wireless communications.

The device data may also include utilization data, which captures how, when, where the user interacts with or operates the connected device. As an illustrative example, for a medical device such as an asthma inhaler, the utilization data may include the frequency of drug delivered to the user, the frequency with which the user uses the inhaler, the time at which the inhaler is used, the location at which the drug is used, although these are exemplary only.

The device data may include the sensed data from the sensor circuitry relating to the environmental conditions in which the connected device is stored or utilized, and taking the illustrative example of the asthma inhaler again, the sensed data may comprise the temperature at which the inhaler is stored when not in use, which may be used, for example, to determine the efficacy of the drug (e.g. when the sensed data indicates that the inhaler is exposed to a temperature exceeding a threshold, a warning may be provided to the user that the efficacy of the drug may be affected).

The types of device data listed above are exemplary only and not an exhaustive list. Other types of device data may also be provisioned on or generated by the connected device as will be apparent to a skilled person taking account of the present specification.

Figure 2:
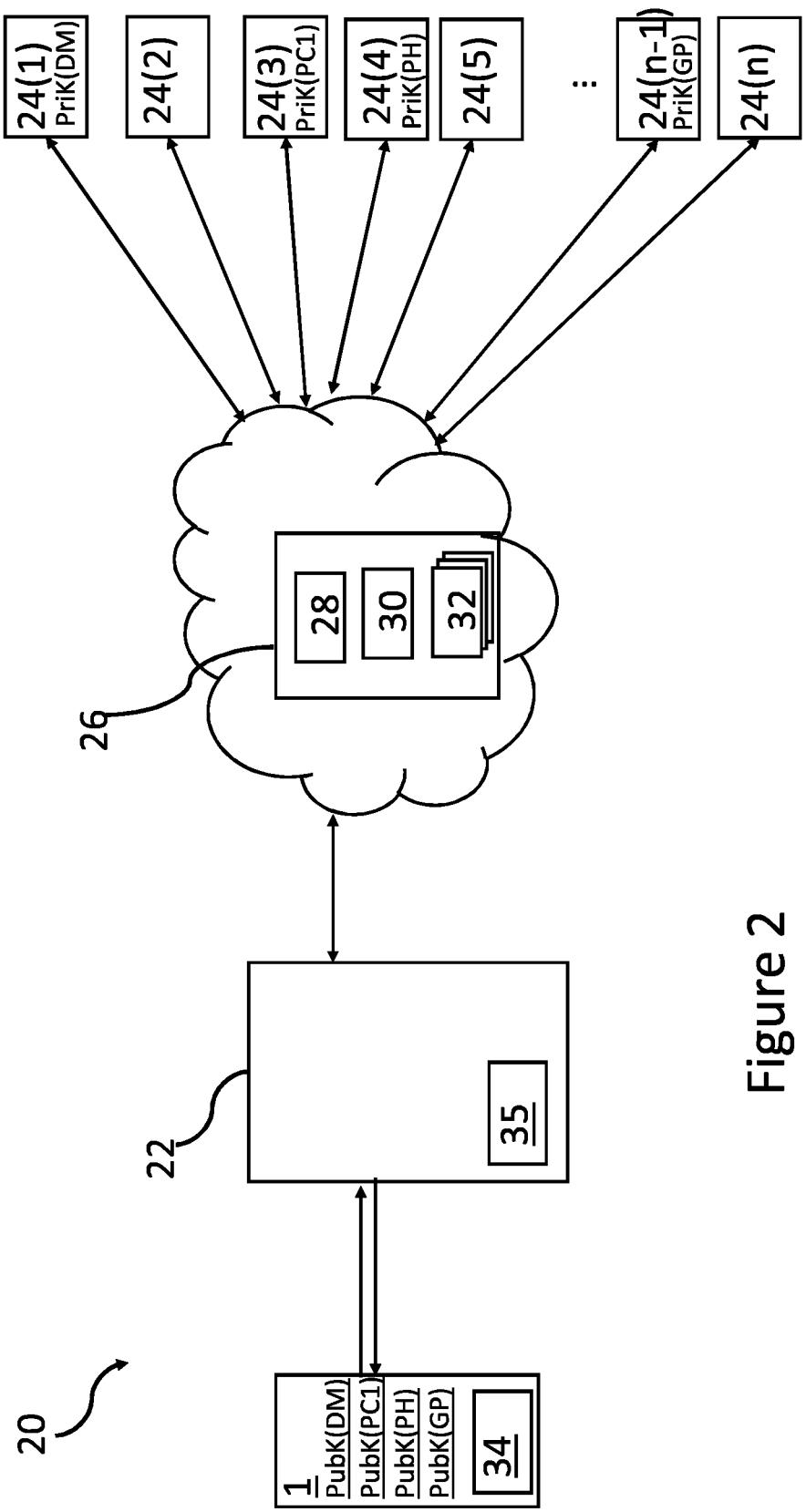
FIG. 2 is a block diagram illustrating an example system according to an embodiment.

FIG. 2 is a block diagram illustrating an example system 20.

Connected device 1 communicates with further computing device 22, whereby computing device 22 may be a mobile phone, laptop, computer, gateway device and the like which runs application(s) thereon, and the further computing device 22 will hereafter be referred to as "application device" 22.

An association (hereafter "trust") is established between the connected device 1 and application device 22, whereby the trust may be established during a registration process between the devices 1, 22, initiated, for example, when the user first turns on the connected device 1 and pairs it with the application device 22 (e.g. using an application running on the application device).

In examples, such trust may be established, for example, by exchanging cryptographic keys between the devices 1, 22. As an illustrative example, connected device 1 may provide a public key thereof ($PubK_{(CD)}$) to the application device 22, whilst the application device 22 may provide a public key thereof ($PubK_{(AD)}$) to the connected device 1. Following the exchange of cryptographic keys, the connected device 1 can encrypt communications transmitted to the application device 22 using the public key $PubK_{(AD)}$, which the application device 22 can decrypt using a corresponding private key $PriK_{(AD)}$. The connected device 1 can also use the public key $PubK_{(AD)}$ to verify communications from the application device when signed with the private key of the application device 22 $PriK_{(AD)}$.

Similarly, the application device 22 can encrypt communications transmitted to the connected device 1 using the public key $PubK_{(CD)}$, which the connected device 1 can decrypt using the corresponding private key $PriK_{(CD)}$. The application device 22 can also use the public key $PubK_{(CD)}$ to verify communications from the connected device 1 when signed with the private key of the connected device 1 $PriK_{(CD)}$.

It will be appreciated that trust may be established in other ways, and the claims are not limited in this respect. For example, trust may be established by exchanging shared or symmetric cryptographic keys or certificates (e.g. X.509 certificates).

The device data provisioned on the connected device 1 at manufacture may comprise bootstrap data, which includes a device identifier (e.g. a uniform resource locator (URL); IPv4, IPv6 address etc.) for a party authorized to provision data on the connected device (e.g. an owner or manufacturer of the device), whereby the device identifier for the authorized party is transmitted to the application device as part of a registration process with the connected device 1.

The application device 22 can then communicate with the authorized party to receive instructions related to the connected device 1. As will be described below, the authorized party may provide one or more instructions/rules to the application device 22 to allow the application device 22 to communicate with the authorized party or another party in accordance with the instructions/rules.

Access to the device data generated by the connected device 1 may be desirable for one or more third parties. Such third parties may provide a service for the connected device 1, whereby such a service may comprise manufacturing the connected device 1, distributing the connected device 1, providing parts for the connected device 1, providing software updates for the connected device etc. It will be appreciated this list is exemplary only and is not intended to be exhaustive. For the purposes of the present specification the interested parties are hereafter referred to as "service providers" and are depicted as service providers 24(1)-24(n).

Continuing with the example of the inhaler, example service providers 24(1)-24(n) may include: a manufacturer of the connected device (depicted as 24(1)), a distributor of the connected device (depicted as 24(2)); a first pharmaceutical company that manufactures the drug(s) for the inhaler (depicted as 24(3)); a pharmacist that dispenses the drug(s) in accordance with a prescription (depicted as 24(4)); an insurance company (depicted as 24(5)); a general practitioner that prescribes the drug(s) to the user (depicted as 24(n−1)); and a second pharmaceutical company that manufactures a rival drug(s) for the inhaler (depicted as 24(n)).

Whilst the service providers may desire access to the device data (e.g. via one or more computer devices, platforms or servers associated therewith), the user may expect that the device data is not accessible by a party without that party obtaining user consent for the necessary permissions (e.g. access permissions) to do so. The user may also expect that a service provider authorized to access device data will not share that device data with an unauthorized service provider (i.e. a service provider that does not have the necessary permissions to access the device data).

In embodiments, the system 20 comprises a data or log resource 26 having one or more logs to store records for one or more of: user consent, permission(s) and device data, such that the records may be used as a verifiable data audit to determine whether a party is authorized to access the device data corresponding to the device data record, that is to determine whether the party has the necessary permissions to access the device data and/or whether the necessary consent approval for the permissions was obtained.

The log resource 26 may be implemented as a centralized database on a server (e.g. using client-server network architecture). In other examples, the log resource 26 may be implemented as a distributed database, whereby different portions of the log resource 26 are hosted on one or more servers across one or more networks, or the log resource 26 may be implemented as a distributed blockchain data structure.

In embodiments, log resource 26 comprises permissions log 28 to store permissions records for the permissions granted to the different parties in the system (e.g. connected device, application device, log resource, service provider 24(1)-24(n)), whereby the permissions define what actions or operations the respective service providers can undertake in respect of the device data.

Such permissions may include: what device data a service provider is permitted to access; the duration for which the service provider can access the data; whether the service provider can share the device data with another service provider(s); how the device data should be stored by the service provider (e.g. on an encrypted database); whether the service provider can share the device data with another party, and, if so, how the device data should be shared with another party (e.g. via secure encryption) etc. The permissions log 28 may also be used to determine who granted permissions in respect of the device data, and the different service providers to whom permissions were granted.

The permissions records stored at the log resource 26 may then be used to determine whether a particular service provider has obtained the necessary permissions to access device data. If not, the permissions records may be used to determine which parties were authorized to access the device data, and a determination made as to how the unauthorized service provider obtained access to the device data from the authorized parties.

As an illustrative example, when the second pharmaceutical company 24(n) accesses device data from connected device 1 (e.g. utilization data), a permissions record at the permissions log 28 can be used to determine whether the second pharmaceutical company 24(n) had the necessary permissions to access the device data, and if so, which party granted those access permissions to the second pharmaceutical company 24(n).

If the second pharmaceutical company did not have the necessary permissions to access the device data, permissions records stored at the permissions log 28 can be used to determine which party or parties had permission to access the data, and, therefore, determine from which party (e.g. via hacking or unauthorized sharing) the second pharmaceutical company 24(n) obtained the device data, in contravention of the original permissions.

In embodiments, the log resource 26 comprises consent log 30 to store consent records, whereby a consent record may include the consent presented to the user for approval (e.g. the text of the consent). A consent record may also comprise a consent status (e.g. user approval or denial for a particular consent) for one or more permissions. The consent record may also define the permissions to which the consent status relates.

In embodiments, the log resource 26 may also comprise device data log 32 to store device data records corresponding to the device data made available for a service provider by the connected device. In embodiments, the log resource 26 comprises a device data log 32 for each of the 'n' service providers.

In embodiments, a device data record may comprise the actual or raw device data made available by the connected device. In other examples, the device data record may comprise a compressed version of the device data made available.

The consent records, permissions records and device data records provide a verifiable data audit from which a user, or other party, can verify whether a party was authorized to access the device data.

As an illustrative example, if the pharmacist 24(n) contacts the user to offer drugs for the inhaler (e.g. as determined from utilization data that the drug in the inhaler is lower than a particular level or that the drug is approaching an expiry date) the records at the permissions log 28 can be checked to determine whether the pharmacist had the necessary permissions to access the utilization data. If it is determined that the permissions were granted to the pharmacist, the permissions records can also be checked to determine which service provider granted the permissions to the pharmacist to access the data. The records at the consent log 30 can also be checked to determine whether user consent approval was obtained for the permissions provided to the pharmacist.

The records stored at the log resource 26 may be immutable, in that they cannot be tampered with or corrupted, or such tampering or corruption can be identified. For example, the records stored in the respective permissions log 28, consent log 30 and device data log 32 may be signed and/or encrypted using an appropriate cryptographic key as will be described in further detail below. Such functionality prevents a party (e.g. the owner and/or administrator of the log resource, a service provider) from decrypting the data without the appropriate cryptographic key.

Furthermore, an authenticity record may be generated for one or more of the records stored at the log resource 26, whereby, in an illustrative example, the corresponding record is transformed in accordance with a suitable transformation algorithm (e.g. SHA256, SHA 512, CRC8, MD5, etc.) to provide a check value (e.g. a check word, checksum) as the authenticity record. If the corresponding record stored at the log resource is not altered, the stored record will provide the same check value as the corresponding authenticity record, when transformed using the same transformation algorithm. However, if the stored record is altered or tampered with, the stored record will not provide the same check value when transformed using the same transformation algorithm. As such, an authenticity record provides a way to verify the integrity of a corresponding record stored at log resource 26, for example by determining whether or not the corresponding record stored at the log resource has been tampered with or corrupted.

The permissions associated with a particular connected device may be defined or specified by an authorized party. In the illustrative example of FIG. 2, the authorized party that defines permissions is the device manufacturer 24(1), whereby the device manufacturer 24(1) may define permissions for itself (e.g. full access to device data generated by the connected device), and further define different permissions in respect of one or more of the service providers 24(2) to 24(n). The device manufacturer will store a record of the respective permissions at the permissions log 28.

The consent to be approved by a user to implement the permissions may also be defined by the same or a different authorized party (e.g. a law firm associated with the device manufacturer).

The consent to be approved by the user may be transmitted from the authorized party to the application device 22 and presented to the user (e.g. on a display screen at the application device), whilst a consent record for the consent to be approved by the user for the one or more permissions is also stored in the consent log 30.

Once user consent is approved, the authorized party may provision a permissions manifest 34 on the connected device 1, whereby the permissions manifest 34 comprises instructions/rules so the connected device 1 can generate device data for a party in accordance with the instructions/rules.

For example, the permissions manifest 34 may define the properties (e.g. format, granularity) of the device data to be made available by the connected device 1 and may further define the properties of the corresponding records (e.g. device data records, authenticity records) to be generated by the connected device.

The permissions manifest may define the destination(s) (e.g. devices, service providers, databases, resources etc.) to which the connected device should transmit the device data and/or records (e.g. by way of suitable identifiers such as URL, IPv4, IPv6 device identifiers).

The permissions manifest may also define the cryptographic algorithms to be used for encrypting or signing the device data and/or records (e.g. Advanced Encryption Standard (e.g. AES256, AES512), Twofish, Threefish, Serpent, Diffie-Hellman, RSA, elliptical curve).

The permissions manifest may also define the transformation algorithm to be used to generate an authenticity record for a corresponding record and/or to compress the device data.

As will be appreciated, instructions in the permissions manifest 34 may define the properties of device data to be generated for different service providers. For example, the instructions may define that the connected device 1 should only encrypt certain types of device data with one cryptographic key (e.g. utilization data, sensed data), and may define that the connected device 1 should encrypt all device data with another cryptographic key. Instructions in the permissions manifest 34 may also define when or how often the connected device should send the device data to a particular service provider. Instructions may also set a size limit for the device data that can be generated for a particular service provider. As such, the properties of the device data generated by connected device 1 can be defined in respect of each service provider.

Instructions in the permissions manifest 34 may also define a validity period for the respective cryptographic keys provisioned on the connected device 1. As such, when permissions expire, the connected device 1 will not generate data for an unauthorized service provider.

The permissions manifest 34 may also define which service providers are authorized to instruct the connected device 1 to perform an operation, and the permissions manifest 34 may also define which operations a particular service provider is authorized to request the connected device to perform 1.

As an illustrative example, the permissions manifest 34 may define that the connected device 1 should not perform any or should only perform certain operations in response to command communications signed with a first cryptographic key (e.g. generate device data for the first service provider) and may define that the connected device should perform all operations in response to communications signed with a second cryptographic key.

In the illustrative example of FIG. 2, the application device 22 will receive instructions from the connected device 1 to contact an authorized party (e.g. as part of a registration process), whereby the authorized party is the device manufacturer 24(1).

The application device 22 receives a device identifier for the device manufacturer 24(1) from the connected device 1 and communicates with the device manufacturer 24(1) to receive the consent to be approved by the user of connected device. In examples, the device manufacturer 24(1) may also provide a manifest 35 to the application device 22, the manifest 35 comprising instructions/rules so the application device 22 can communicate with the device manufacturer or another party/device/platform (e.g. resource log or service provider) in accordance with the instructions/rules.

When the user approves (or denies) consent (e.g. by providing an input via the display screen at the application device), a consent record comprising the consent status (e.g. user approval or denial) is encrypted by the application device 22 (e.g. using a trusted cryptographic key which may be obtained from the connected device 1 or received from the authorized party as part of the registration process) and the encrypted consent record transmitted to the log resource 26.

The encrypted consent record is then stored in the consent log 30. The application device 22 may also sign the consent record with its private key ($PriK_{(AD)}$), such that the identity of the device at which the consent record was generated can be verified.

When consent approval is received by the device manufacturer 24(1) (e.g. received from the application device or accessed at the log resource), the device manufacturer 24(1) will provision the connected device with the necessary data to enable it to implement the permissions for which consent was approved.

For example, the device manufacturer 24(1) may provision identifier(s) (e.g. device identifier and/or trust identifier) for different service providers on the connected device (e.g. via the application device), and the identifiers stored locally at the connected device 1. As depicted in the illustrative example of FIG. 2, trust identifiers transmitted to the connected device 1 comprise a public key for the device manufacturer PubK(DM), a public key for the first pharmaceutical company PubK(PC1), a public key for the pharmacist Pub(Ph), and a public key for the GB PubK(GP). The user may have not approved consent for permissions to be granted to the other service providers in the system, or such consent may not have been requested.

The connected device 1 is also provisioned with permissions manifest 34 (e.g. from the device manufacturer via the application device 22 whereby the permissions manifest 34 comprises instructions/rules so the connected device 1 can generate device data for the service providers in accordance with the instructions/rules. A record of the permissions manifest is also stored at the log resource 26 (e.g. in a manifest log (not shown in FIG. 2)). A verifiable authenticity record of the permissions manifest provisioned on the connected device 1 may also be stored along with the permissions manifest record, whereby the authenticity record may comprise a check value for the permissions manifest record.

The connected device 1 can then generate device data for the service providers in accordance with the permissions for which consent was approved by the user.

An encrypted device data record of the device data generated for a particular service provider is stored in the device data log 32. The record may be encrypted with a cryptographic key for different parties, so that different authorized parties can subsequently decrypt the record and access the device data therein. Such functionality means that the device data record in the device data log 32 can only be accessed by an authorized party. An authenticity record for the device data record may also be stored along with the encrypted device data record so as to determine whether the record is subsequently altered or tampered with.

Should a party access the device data in the device data record, the corresponding permissions record can be used to determine whether that party had the necessary permissions to access the device data, whilst the corresponding consent record can be used to determine whether consent approval was provided for the permissions. Furthermore, providing authenticity records for the respective records means any tampering or alteration of the respective records stored at the log resource 26 will be also identifiable.

It will be appreciated therefore, that the consent records, permissions records and device data records stored at the log resource provide a verifiable data audit to determine whether or not a party is (or was) authorized to access the device data therein.

In embodiments service providers may transmit command communications to the connected device 1 in accordance with one or more permissions, whereby the command communication comprises an instruction for the connected device 1 to perform an operation (e.g. generate device data, provide a sensory output etc.).

For instance, the device manufacturer 24(1) may provision a device identifier and/or trust identifier for the connected device 1 on the service providers in accordance with the permissions for which user consent is approved.

In embodiments, the device manufacturer 24(1) may also provision the service providers with permissions manifests, whereby instructions or rules in the permissions manifests provisioned on the respective service providers may define how the service providers should interact with the connected device in accordance with the permissions for which user consent is approved. A record of a permissions manifest provisioned on a service provider will also be stored at the log resource 26 by the device manufacturer 24(1). The permissions manifests at the respective service providers will also be updated in accordance with updated user consent approval.

In operation, the command communications from the service providers may be signed with respective cryptographic key thereof, whereby the connected device 1 can verify the signature and perform the requested operation in accordance with the permissions. As above, a record of the command communications transmitted from the respective service providers will also be stored at the log resource 26.

As will be appreciated, an authorized party (e.g. the device manufacturer) may be required to obtain consent approval for updated permissions from the user, and transmits the updated consent for to the application device 22 for approval by the user.

As an illustrative example, when the first pharmaceutical company (24(3)) is replaced by the second pharmaceutical company (24(n)) as manufacturer of the drug in the inhaler, the user will be requested (e.g. via application device 22) to provide updated consent for the updated permissions.

When the user approves the updated consent, a consent record comprising the consent status for the updated consent is encrypted by the application device 22 and transmitted to the log resource 26. A trust identifier for the second pharmaceutical company (e.g. $PubK_{(PC2)}$) may be transmitted to the connected device 1 and stored thereon. An updated permissions manifest 34 may also be provided to the connected device 1 defining the instructions in relation to ($PubK_{(PC2)}$). In embodiments the connected device 1 will be instructed to discard or disregard the identifier(s) for the first pharmaceutical company. The permissions log 30 will also be updated with a permissions record in accordance with the updated consent, whilst authenticity records may also be provided for the respective updated records.

Figure 3:
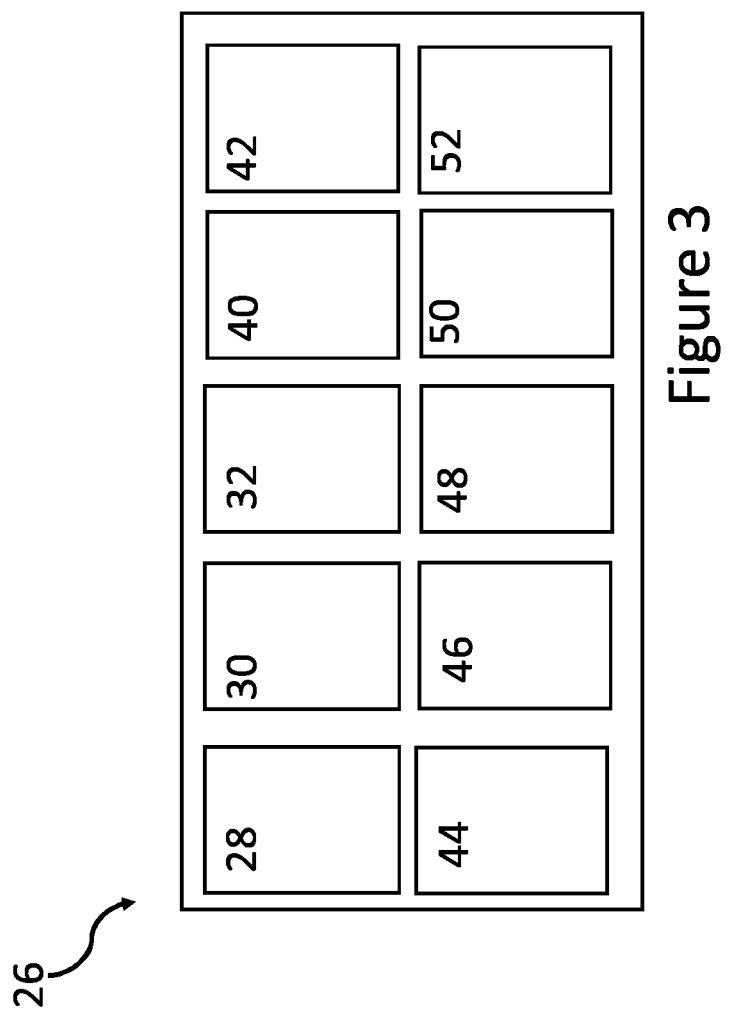
FIG. 3 illustratively shows examples of different logs provided at the log resource according to an embodiment.

Although FIG. 2 depicts consent log 28, permissions log 30 and device data log 32, the log resource 26 may comprise other data logs, and FIG. 3 illustratively shows examples of further logs that may be provided at the log resource 26. It will be appreciated that FIG. 3 is exemplary only, and the claims are not limited to the particular logs depicted therein, and it will be appreciated that other types of logs may also be provided at the log resource 26.

In addition to the consent log 28, permissions log 30, device data log 32, the log resource 26 may also comprise permissions manifest log 40 to store records of permissions manifests provisioned on the different parties.

The log resource 26 may comprise a command log 42 which stores a record of the command communications received at the connected device from the respective service providers. Such functionality provides a verifiable data audit for command communications received at the connected device, whereby if the connected device is the subject of an attack (e.g. a denial of service attack) by being overloaded with requests from a service provider to perform operations, the command log will provide evidence of where the requests originated.

The log resource 26 may include user log 44, which stores a record of user details relating to the user registered to a particular connected device. Such user details may include the name of the user, occupation, address, telephone number, emergency contact number, health status etc. Such user details may be entered by the user when undertaking a registration with the application device.

The log resource may include connected device identification data log 46 for storing records of the connected device identification data of further connected devices associated with the user.

The log resource 26 may include service provider identification data log 48 for storing the service provider identification data of different service providers granted a permission in respect of a connected device, whereby service provider identification data may include one or more of: UUID, GUID and IP addresses, although the claims are not limited in this respect.

The log resource 26 may comprise application log 52 to store records of the applications/code provisioned on the connected device, application device and/or on the service providers (e.g. name, version, date of installation, inputs from a user (e.g. button presses) interacting with connected device etc.).

In some embodiments the log resource may comprise authenticity log 52 to store authenticity records corresponding to the one or more records stored at the log resource 26. In some embodiments the authenticity record may be combined with or concatenated to the respective corresponding record (e.g. permissions records, consent records, device data records).

In embodiments, the one or more records stored at the log resource 26 may comprise associated metadata (not shown), comprising non-personal identifiable information relating to the record and/or the data within the record. In embodiments, the application device may generate the metadata when an encrypted record is received from the connected device whereby the metadata may comprise (e.g. date, time and/or location at which the record or data therein was received from the connected device; or the type of connected device that generated the record). Additionally, or alternatively, the log resource may also generate metadata for the records stored thereat (e.g. time/date received). In embodiments the metadata may be concatenated to the respective records or stored separate therefrom in the log resource 26 (e.g. in a metadata log (not shown)), whereby the metadata provides for filtering of the records (e.g. filtering by date and/or time created). In some embodiment the metadata may be unencrypted.

Although only one connected device is depicted in the illustrative system of FIG. 2, there may in fact be any number of connected devices in the system (e.g. from one up to billions of such connected devices).

As the number of devices associated with a user increases, the user may be required to actively provide consent approval for all permissions for the different devices.

To reduce the burden of providing active consent for every connected device acquired by the user, in some embodiments, once consent is approved for a connected device, that consent may be applied to one or more further connected devices acquired by the user. Using the example of the inhaler in FIG. 2 above, if the user buys a replacement inhaler, the permissions for which the user has previously approved consent may be implemented at the replacement inhaler. Therefore, the replacement inhaler will be provided with the necessary identifier(s) and permissions manifest to operate in accordance with the permissions for which consent was previously approved by the user. Similarly, the service providers will also be provisioned with identifiers/updated manifests for the replacement inhaler. It will be appreciated that such functionality is not limited to the same devices, and different types of connected devices acquired by the same user may receive the necessary data (e.g. identifiers, manifests) to implement permissions which the user previously consented to.

As before, records (e.g. for the permissions, consent, device data) generated in respect of the different connected devices will be stored at the log resource 26. Such functionality means that the user does not have to actively consent to permissions after obtaining a new/replacement connected device, whilst the records generated in respect of the connected devices provide a verifiable data audit to determine whether a party is authorized to access the device data generated thereby.

Furthermore, the storage/processing burden on the log resource 26 and/or the communications infrastructure (e.g. bandwidth) may increase as the number of connected devices and/or service providers increases.

To reduce such storage, processing and/or communications burdens, the system may comprise multiple instances of the log resource 26, whereby each instance of the log resource 26 stores a subset of the data or records stored at the log resource 26. For example, a first instance may store data or records for a first set of users, a first set of connected devices and/or a first set of service providers, whilst a second instance may store data or records for a second set of users, a second set of connected devices and/or a second set of service providers.

Figure 4:
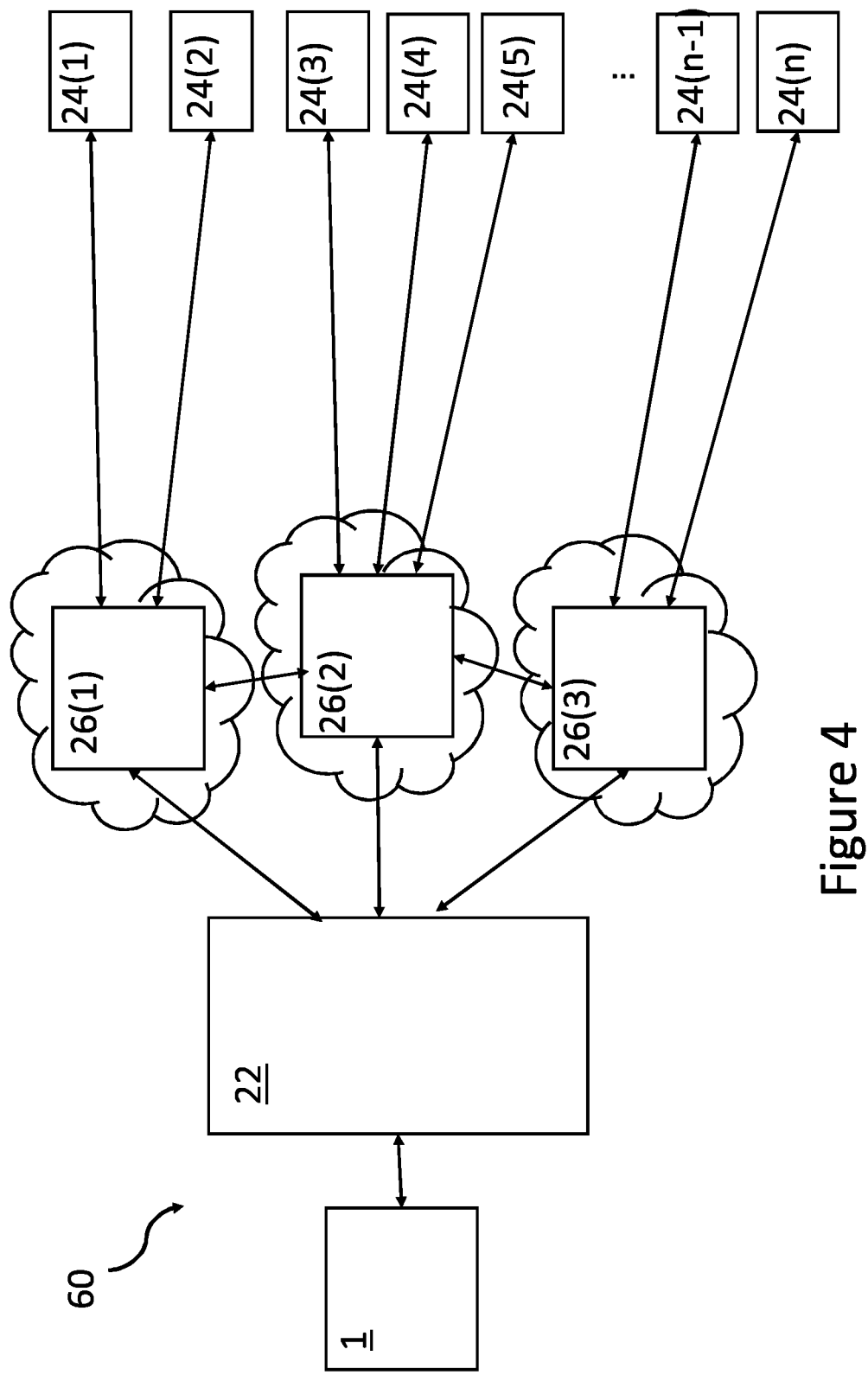
FIG. 4 is a block diagram illustrating an implementation of the log resource in a system according to an embodiment.

As an illustrative example, FIG. 4 shows a block diagram illustrating an implementation of the log resource 26 having multiple instances.

System 60 comprises three instances of log resource 26(1)-26(3), whereby data or records relating to service providers 24(1) & 24(2) is stored at log resource 26(1); data or records relating to service providers 24(3)-24(5) is stored at log resource 26(2); and data or records relating to service providers 24(n−1) & 24(n) is stored at log resource 26(3).

FIG. 4 depicts the different instances as being physically separate from each other. Such physical separation may be provided by hardware partitioning on a server, or hosting the different instances on different servers and/or on different networks. Such functionality means that if the connected device generates device data for all service providers at substantially the same time, the device data records can be sent to the appropriate instance of log resource 26(1)-26(3), thereby reducing the processing/storage/communications burden in comparison to transmitting the device data records to the same instance of the log resource 26.

In some examples, the permissions manifest provided to a connected device may define which instance of log resource 26(1)-26(3) the connected device should communicate with in respect of a particular service provider. Similarly, the permissions manifest provisioned on a service provider may define which instance of log resource the service provider should transmit consent records, permissions records, command communication records. Similarly, the permissions manifest provisioned on an application device may define which instance of log resource the application device should transmit consent records, permissions records etc.

Figure 5:
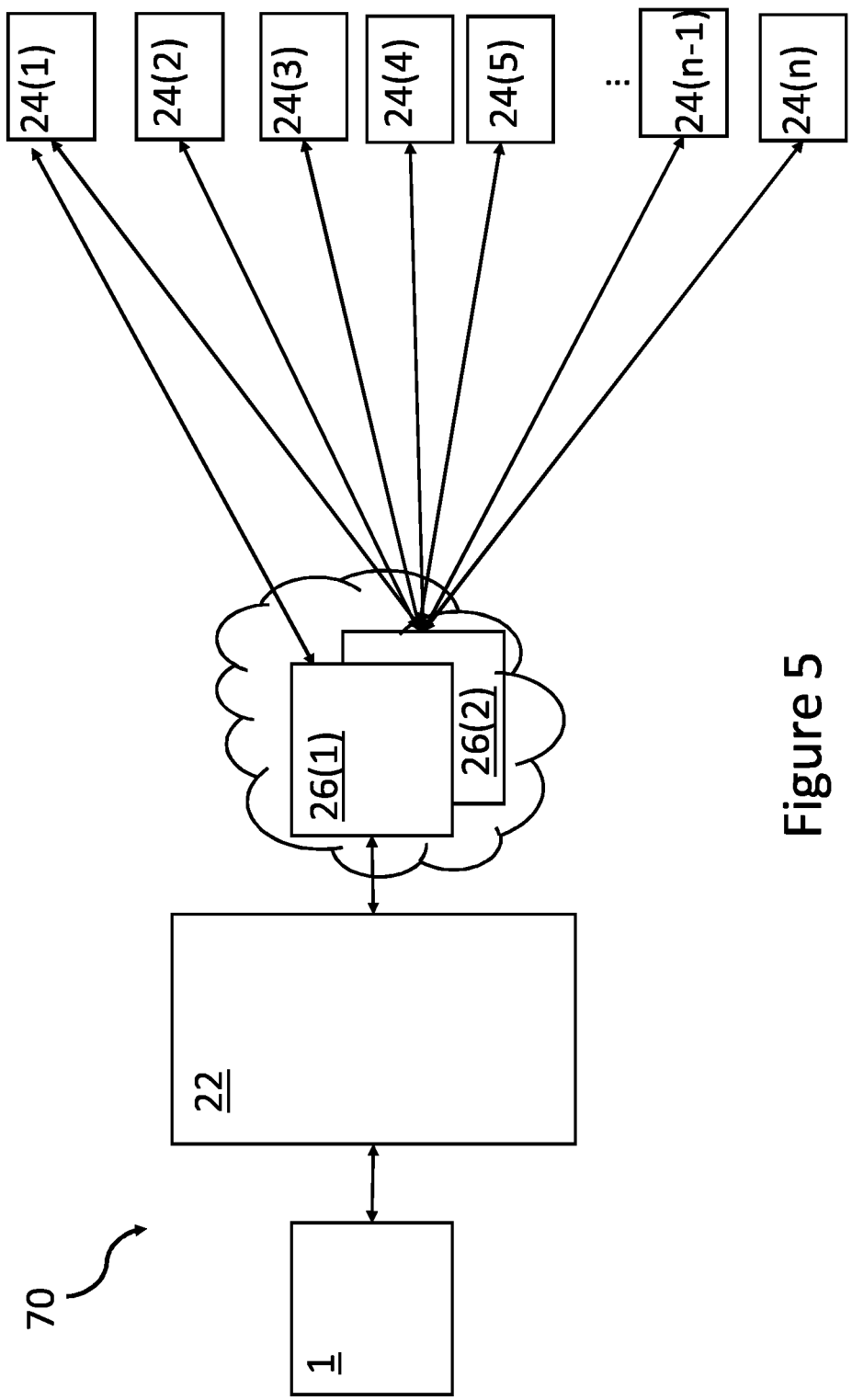
FIG. 5 is a block diagram illustrating a further implementation of the log resource in a system according to a further embodiment.

Different instances of a log resource may, additionally or alternatively, be provided with logical separation, whereby FIG. 5 shows a block diagram illustrating an implementation of the log resource 26 in system 70, whereby two instances of the log resource 26(1) and 26(2) are depicted as being hosted on the same server or network but having a logical separation (e.g. using software partitioning).

In the illustrative example of FIG. 5, data stored in log resource instance 26(1) generally relates to data or records for a connected device, and may comprise for example: device data records; user consent records; the permissions manifest records for the connected device.

Similarly, the data or records stored in log resource instance 26(2) generally relates to data or records for a service provider and may relate to permissions records for the respective service providers; consent records for the respective service providers.

The log resource instance 26(1) may only be accessible to certain authorized parties e.g. based on the cryptographic keys used to encrypt the stored data. The log resource instance 26(2) may only be accessible to certain authorized parties e.g. based on the cryptographic keys used to encrypt the stored data. As depicted in FIG. 5, some parties may store/access data in both instances, e.g. whereby an authorized party 24(1) may have the necessary keys to store/access data on both logically separate instances.

Figure 6:
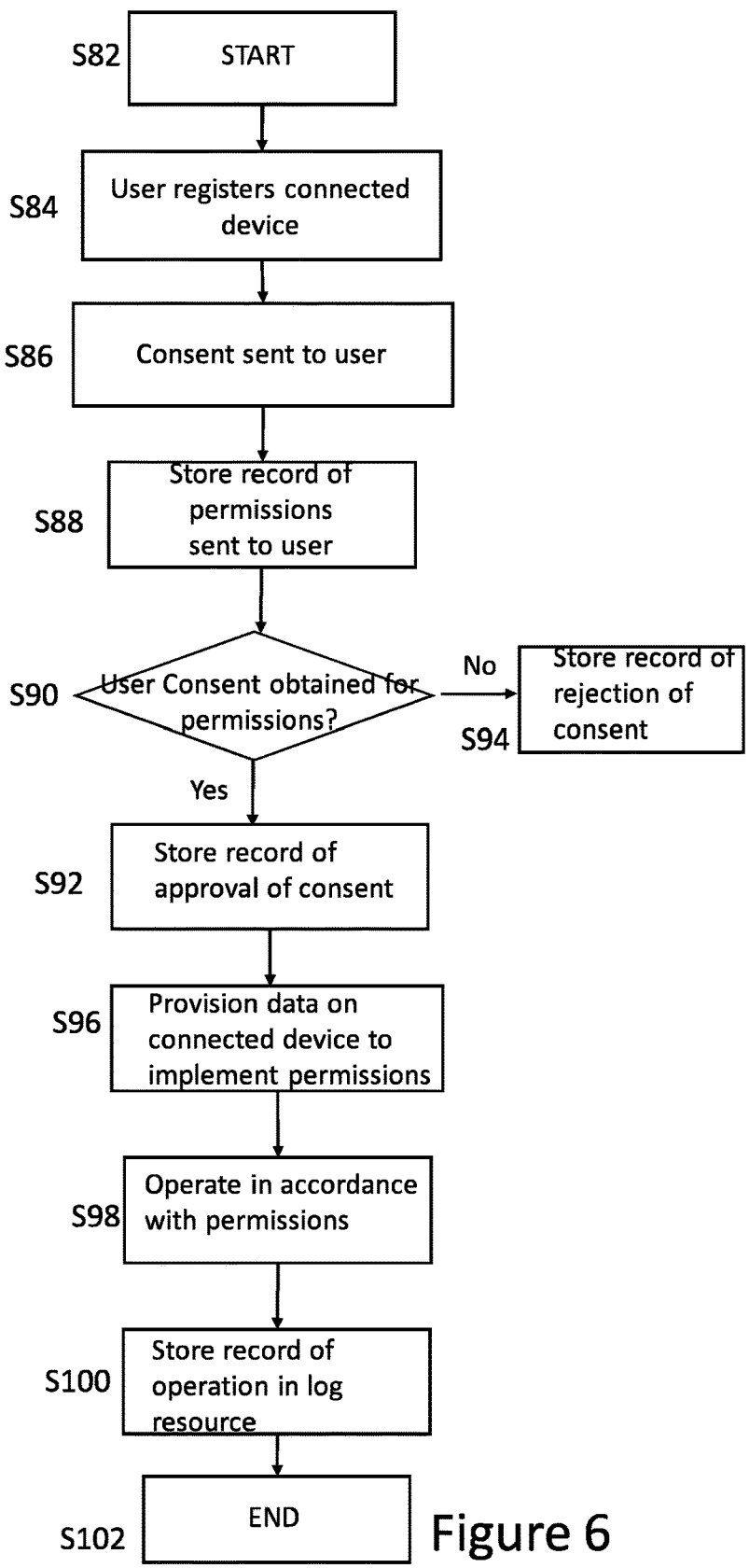
FIG. 6 illustratively shows a simplified flow diagram for managing consent for device data.

FIG. 6 illustratively shows a simplified flow diagram of a method 80 for managing consent for device data of a connected device.

At step S82, the method starts.

At step S84 a user registers a connected device with an application device (e.g. via an application running on the application device), whereby in an illustrative example, registration comprises establishing trust between the connected device and the application device. As part of establishing trust, cryptographic keys for the application device and connected device may be exchanged to establish trust.

At step S86, the user is requested to provide consent for one or more permissions to be granted to an authorized party (e.g. the manufacturer of the connected device). The user may also be requested to approve consent for one or more permissions to be granted by the authorized party to one or more other parties (e.g. service providers).

The permissions may relate to the level of authorisation to be granted to a party to access device data. The permissions may also relate to the level of authorisation to be granted to a party to control the connected device (e.g. by sending command communications thereto).

At step S88 an encrypted record of the permissions for which consent is sought by the authorized party is transmitted to the log resource and stored thereat. In some embodiments an authenticity record may be stored with the permissions record.

At step S90, the user provides consent for the permissions (e.g. via a display on the application device, and at step S92, a consent record comprising the consent status (e.g. approval) is stored at the log resource. At step S94, a consent record comprising the consent status (e.g. rejection) is transmitted to and stored at the log resource, when the user does not approve consent. The application device may encrypt the consent record with a cryptographic key. Furthermore, an authenticity record may be stored with the consent record.

At step S96, when the consent is approved, the connected device may be provisioned with the data necessary to enable one or more parties to implement the permissions. Such data may comprise an identifier for the one or more parties, whereby the identifier may comprise a device identifier and/or trust identifier such as a cryptographic key (e.g. public key of the respective parties). Such data may also comprise a permissions manifest defining the permissions associated with each cryptographic key. In embodiments the one or more parties will also be provided with one or more cryptographic keys for the connected device so as to interact therewith in accordance with the permissions (e.g. to send command communication to the connected device). A record of the data provisioned on the connected device necessary to enable the service providers to implement the permissions will also be stored in the log resource. Furthermore, an authenticity record may be stored with the record of the data.

At step S98 the connected device operates in accordance with the permissions (e.g. as defined by instructions/rules in the permissions manifest), generating device data and transmitting encrypted data to the respective parties (e.g. via the log resource).

At step S100 an encrypted record of the device data transmitted to the respective parties stored is stored at the log resource. Furthermore, an authenticity record may be stored with the device data record.

At step S102 the method ends.

As described above, records (E.g. for the consent, the permissions and the device data) are stored at the log resource in a secure and immutable manner, and provide a verifiable data audit should the device data be accessed by an unauthorized party that does not have the permissions to access that device data, or for which consent was not approved. When the records are encrypted, only a party having an appropriate cryptographic key can access the data. Furthermore, the data is immutable because the any tampering can be detected by verifying the integrity of the records using corresponding authenticity records (e.g. by comparing check values for the stored record against check values in the corresponding authenticity record).

It will be appreciated that the mechanism by which the records are stored at the log resource and by which data is transmitted between the different parties may be defined in the manifests provisioned at the respective parties.

For example, in some embodiments a record (e.g. permissions record, consent record and/or device data record) may be transmitted from one party (e.g. a connected device) to another party (e.g. a service provider), or vice versa, via the log resource along with the corresponding data, such that the record is automatically stored at the log resource whilst the corresponding data is transmitted to the appropriate party. Additionally, or alternatively, data may be transmitted from one party to another party without passing through the log resource, whilst the corresponding record will be transmitted to the log resource.

In embodiments, the device data generated by the connected device may be transformed using a transformation operation, whereby the device data record may comprise the result of the transformation operation (e.g. a check value) and stored at the log resource. The corresponding device data generated by the connected device may be transmitted (encrypted or unencrypted) to a further database (e.g. in accordance with a rule in the permissions manifest) and stored thereat. As such, the device data record will be stored at the log resource, with the device data generated by the connected device stored at the further database. As the device data at the further database will be linked to the device data record by the check value in the record at the log resource, and the integrity of the data verifiable (e.g. by an associated authenticity record) the storage burden at the log resource will be reduced in comparison to storing the device data at the log resource.

Although the embodiments above generally describe the connected device being an inhaler, the claims are not limited in this respect and a person skilled in the art having read this specification will readily recognise how the present techniques may be applied to connected devices in the other industries, such as leisure/fitness; automotive; home appliance; industrial etc.

Embodiments of the present techniques provide a non-transitory data carrier carrying code which, when implemented on a processor, causes the processor to carry out the methods described herein.

The techniques further provide processor control code to implement the above-described methods, for example on a general-purpose computer system or on a digital signal processor (DSP). The techniques also provide a carrier carrying processor control code to, when running, implement any of the above methods, in particular on a non-transitory data carrier or on a non-transitory computer-readable medium such as a disk, microprocessor, CD- or DVD-ROM, programmed memory such as read-only memory (firmware), or on a data carrier such as an optical or electrical signal carrier. The code may be provided on a (non-transitory) carrier such as a disk, a microprocessor, CD- or DVD-ROM, programmed memory such as non-volatile memory (e.g. Flash) or read-only memory (firmware). Code (and/or data) to implement embodiments of the techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

Computer program code for carrying out operations for the above-described techniques may be written in any combination of one or more programming languages, including object-oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

It will be understood that, although the terms first, second, etc. may be used herein to describe various features, these features should not be limited by these terms. These terms are only used to distinguish one feature from another.

Furthermore, the term "and/or" includes any and all combinations of one or more of the associated listed items.

Furthermore, the terminology used herein is for the purpose of describing embodiments only and is not intended to be limiting. For example, as used herein the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In the preceding description, various embodiments of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

Accordingly some aspects and features of the disclosed embodiments are set out in the following numbered items:
1) A system comprising: a data resource comprising: a device data log to store a device data record for device data of a first device; a permissions log to store a permissions record for one or more permissions associated with the device data; a consent log to store a consent record comprising a consent status for the one or more permissions; wherein the consent record, permissions record and device data record provide a verifiable data audit to determine whether a party is authorized to access the device data.

2) The system of item 1, wherein the one or more permissions define one or more actions or operations the party can undertake in respect of the device data.
3) The system of item 2, wherein the consent status defines whether consent for the one or more permissions is approved or denied by a user associated with the first device.
4) The system of item 1, wherein one or more of the device data record, the permissions record and the consent record are encrypted by the connected device.
5) The system of item 1, wherein one or more of the device data record, the permissions record and the consent record comprise a corresponding authenticity record.
6) The system of item 1, wherein the first device is provisioned with an identifier for a first party, and wherein the first device transmits the device data to the first party in accordance with the one or more permissions for the first party.
7) The system of any item 6, wherein the identifier for the first party comprises a cryptographic key of the first party.
8) The system of item 1, wherein the first party is provisioned with an identifier for the first device, and wherein the first party transmits a command communication to the first device.
9) The system of item 8, wherein the first device performs an operation based on or in response to the command communication in accordance with the one or more permissions for the first party.
10) The system of item 6, wherein the first device is provisioned with a permissions manifest, wherein the permissions manifest defines the one or more permissions for the first party.
11) The system of item 1, comprising two or more instances of the data resource.
12) The system of item 11, wherein each instance of the data resource stores a subset of the data or records stored at the data resource.
13) The system of item 11, wherein the two or more instances of the data resource comprise a physical separation therebetween.
14) The system of item 11, wherein the two or more instances of the data resource comprise a logical separation therebetween.
15) The system of item 1, wherein the data resource is implemented as a distributed blockchain data structure.
16) The system of item 1, further comprising an application device to provide the identifier of the first party to the first device.
17) The system of item 1, further comprising an application device to provide the identifier of the first device to the first party.
18) The system of any item 1, wherein the user approves or denies consent via the application device.
19) The system of item 1, wherein the data resource comprises metadata relating to one or more of: the device data record, the permissions record and the consent record.
20) A method of determining whether a party is authorized to access device data of a first device, the method comprising: receiving, at a data resource, a device data record for the device data; receiving, at the data resource, a permissions record for one or more permissions associated with the device data; receiving, at the data resource, a consent record comprising a consent status for the one or more permissions; accessing, at the data resource, the device data record, the permissions record and the consent record; determining from one or more of the accessed consent and permissions records whether the party is authorized to access the device data corresponding to the accessed device data record.

21) A method of managing access to device data of a first device, the method comprising: receiving, at an application device, a first request for user approval of a first consent, the first consent related to first permissions for a first party to access first device data of the device data; obtaining, at the application device from the user, user approval for the first consent; transmitting, from the application device to a data resource, a consent record of the user approval for the first consent; receiving, at the application device, an identifier for the first party; transmitting, from the application device to the first device, the identifier for the first party to enable the first device generate the first device data for the first device.
22) The method of item 21, comprising: encrypting, at the application device, the consent record.
23) The method of item 21, wherein the identifier for the first party comprises a cryptographic key to enable the first device to encrypt a first device data record for the first device data.
24) The method of item 23, comprising: receiving, at the application device from the first device, the encrypted first device data record; transmitting, from the application device to the data resource or the first party, the encrypted first device data record.
25) The method of item 21, further comprising: determining whether the first party is authorized to access the first device data; transmitting the identifier for the first party to the first device when it is determined that that first party is authorized to access the first device data.
26) The method of item 24, further comprising: generating, at the application device, metadata relating to the consent record and/or the first device data record.
27) The method of item 21, further comprising: receiving, at an application device, a second request for user approval of a second consent, the second consent related to second permissions for a second party to access second device data of the device data; obtaining, at the application device from the user, user approval for the second consent; transmitting, from the application device to the data resource, a consent record of the user approval for the second consent; receiving, at the application device, an identifier for the second party; transmitting, from the application device to the first device, the identifier for the second party to enable the first device generate the second device data.
28) The method of item 27, wherein one or more properties of the first device data are different from one or more properties of the second device data.
29) The method of item 28, wherein the one or more properties comprise one or more of: frequency of data, size of data and type of data.
30) A method of generating device data at a device, comprising: receiving at the device an identifier for a first party; receiving at the device a permissions manifest; generating, at the device, device data for the first party based on or in response to instructions in the permissions manifest; transmitting, from the device to the first party, the device data for the first party.
31) The method of item 30, further comprising: transmitting, from the device to a data resource, a device data record of the device data transmitted to the first party.
32) The method of item 31, further comprising: encrypting, at the device, the device data record.
33) The method of item 32, wherein encrypting the device data record comprises: encrypting the device data record using the private cryptographic key of the first party.

34) The method of item 30, further comprising: generating, at the device, an authenticity record for the device data record; transmitting, from the device to the data resource, the authenticity record.

35) The method of item 34, wherein the authenticity record comprises a check value for the device data record.

36) The method of item 30, comprising: receiving at the device an identifier for a second party; generating, at the device, device data for the second party based on or in response to instructions in the permissions manifest; transmitting, from the device to the second party, the device data for the second party.

37) The method of item 36, wherein one or more properties of the device data for the first party are different from one or more properties of the device data for the second party.

38) A device comprising circuitry to perform the method of any one of items 20 to 37.

39) A non-transitory computer readable storage medium comprising code which when implemented on a processor causes the processor to carry out the method of any of items 20 to 37.

40) A system comprising: a first device to generate device data and a device data record corresponding to the device data, the first device comprising a permissions manifest to define properties of the device data and device data record; wherein the first device is to transmit the device data to a first destination specified in the manifest; and wherein the first device is to encrypt the device data record and transmit the encrypted device data record to a second destination specified in the manifest; a data resource, corresponding to the second destination, comprising: a device data log to store the encrypted device data record; a permissions log to store a permissions record for one or more permissions, the one or more permissions to define the actions or operations one or more parties can undertake in respect of the device data; a consent log to store a consent record comprising a consent status for the one or more permissions; wherein the consent record, permissions record and encrypted device data record provide a verifiable data audit to, after a first party accesses the device data, enable a second party to determine whether the first party was authorized to access the device data.

41) A method of determining whether a first party is authorized to access device data generated by a first device, the method comprising: receiving, from the first device and storing at a data resource, an encrypted device data record for the device data; receiving and storing, at the data resource, a permissions record for one or more permissions, the one or more permissions to define the actions or operations one or more parties can undertake in respect of the device data; receiving and storing, at the data resource, a consent record comprising a consent status for the one or more permissions; when the first party accesses the device data: accessing, by a second party, the encrypted device data record, the permissions record and the consent record; decrypting, by the second party, the encrypted device data record; determining, by the second party, whether the first party was authorized to access the device data based on the decrypted device data record, the consent record and permissions record.

The invention claimed is:

1. A system comprising:
a first hardware device including a permissions manifest defining properties of device data and a device data record, the first hardware device configured to:
generate the device data and the device data record corresponding to the device data,
encrypt the device data and transmit the encrypted device data to a first destination specified in the permissions manifest, and
encrypt the device data record and transmit the encrypted device data record to a second destination specified in the permissions manifest;
a data resource, corresponding to the second destination, comprising:
a device data log to store the encrypted device data record, where decryption of the encrypted device data record in the device data log is restricted to one or more authorized parties;
a permissions log to store a permissions record for one or more permissions that define actions or operations one or more parties can undertake in respect of the device data;
a consent log to store a consent record comprising a consent status for the one or more permissions,
wherein the consent record, permissions record and encrypted device data record provide a verifiable data audit to enable, after a first party accesses the device data, a second party authorized to decrypt the device data record to determine whether the first party was authorized to access the device data.

2. The system of claim 1, wherein the consent status defines whether consent for the one or more permissions is approved or denied by a user associated with the first hardware device.

3. The system of claim 1, wherein one or more of the device data record, the permissions record and the consent record comprise a corresponding authenticity record.

4. The system of claim 1, wherein the first hardware device is provisioned with an identifier for the first party, and wherein the first hardware device transmits the device data to the first party in accordance with the one or more permissions for the first party.

5. The system of claim 4, wherein the identifier for the first party comprises a cryptographic key of the first party.

6. The system of claim 1, wherein the first party is provisioned with an identifier for the first hardware device, and wherein the first party transmits a command communication to the first hardware device.

7. The system of claim 6, wherein the first hardware device performs an operation based on or in response to the command communication in accordance with the one or more permissions for the first party.

8. The system of claim 4, wherein the permissions manifest defines the one or more permissions for the first party.

9. The system of claim 1, comprising two or more instances of the data resource.

10. The system of claim 9, wherein each instance of the data resource stores a subset of the data or records stored at the data resource.

11. The system of claim 9, wherein the two or more instances of the data resource comprise a physical separation therebetween.

12. The system of claim 9, wherein the two or more instances of the data resource comprise a logical separation therebetween.

13. The system of claim 1, wherein the data resource is implemented as a distributed blockchain data structure.

14. The system of claim 1, further comprising an application device to provide the identifier of the first party to the first hardware device.

15. The system of claim 1, further comprising an application device to provide the identifier of the first hardware device to the first party.

16. The system of claim 1, wherein the data resource comprises metadata relating to one or more of: the device data record, the permissions record and the consent record.

17. A method of determining whether a party is authorized to access device data generated and encrypted by a first hardware device, the method comprising:

receiving, from the first hardware device and storing at a data resource, an encrypted device data record for the device data, where decryption of the encrypted device data record is restricted to one or more authorized parties;

receiving and storing, at the data resource, a permissions record for one or more permissions that define actions or operations one or more parties can undertake in respect of the device data;

receiving and storing, at the data resource, a consent record comprising a consent status for the one or more permissions;

when a first party remote from the data source accesses the device data:

accessing, by a second party, the encrypted device data record, the permissions record and the consent record;

decrypting, by the second party, the encrypted device data record, where the second party is authorized to decrypt the encrypted device data record; and determining, by the second party, whether the first party was authorized to access the device data based on the decrypted device data record, the consent record and permissions record.

18. A non-transitory computer readable storage medium comprising code which when implemented on a processor causes the processor to carry out the method of claim 17.

* * * * *